(12) United States Patent
Rottler et al.

(10) Patent No.: US 6,983,890 B2
(45) Date of Patent: Jan. 10, 2006

(54) VEHICLE HEATING APPLIANCE WITH A VALVE IN THE FUEL SUPPLY

(75) Inventors: Christian Rottler, Munich (DE); Andreas Huber, Munich (DE)

(73) Assignee: Webasto Thermosysteme International GmbH (DE)

( * ) Notice: Subject to any disclaimer, the term of this patent is extended or adjusted under 35 U.S.C. 154(b) by 226 days.

(21) Appl. No.: 10/348,681

(22) Filed: Jan. 21, 2003

(65) Prior Publication Data

US 2003/0178499 A1 Sep. 25, 2003

(30) Foreign Application Priority Data

Jan. 21, 2002 (DE) .......................... 102 02 087
Dec. 12, 2002 (DE) .......................... 102 58 190

(51) Int. Cl.
*B60H 1/00* (2006.01)

(52) U.S. Cl. .................... 237/12.3 C; 165/41; 165/42
(58) Field of Classification Search ............ 237/12.3 C, 237/12.3 B, 12.3 R; 165/41, 42
See application file for complete search history.

(56) References Cited

U.S. PATENT DOCUMENTS

| | | | | |
|---|---|---|---|---|
| 3,307,569 A | | 3/1967 | Erikson | |
| 3,877,639 A | * | 4/1975 | Wilson et al. | 237/12.3 C |
| 3,894,579 A | * | 7/1975 | Brille | 165/6 |
| 4,706,740 A | * | 11/1987 | Mahefkey | 165/104.14 |
| 5,253,806 A | * | 10/1993 | Gaysert et al. | 237/12.3 C |
| 5,340,020 A | * | 8/1994 | Maus et al. | 237/12.3 C |
| 5,630,475 A | * | 5/1997 | Sabin et al. | 165/281 |
| 5,988,156 A | * | 11/1999 | Schmid et al. | 126/110 B |
| 6,079,629 A | * | 6/2000 | Morikawa et al. | 237/12.3 C |
| 6,164,554 A | | 12/2000 | Pfister et al. | |
| 6,308,895 B1 | * | 10/2001 | Atxa et al. | 237/2 A |

FOREIGN PATENT DOCUMENTS

| | | |
|---|---|---|
| AT | 318 118 | 3/1972 |
| DE | 1 401 761 | 11/1968 |
| DE | 36 36 647 | 5/1988 |
| DE | 42 27 716 | 2/1994 |
| DE | 44 15 513 | 9/1994 |
| DE | 195 26 003 | 2/1996 |
| DE | 195 45 677 | 6/1997 |
| DE | 197 24 502 | 10/1998 |

* cited by examiner

*Primary Examiner*—Derek S. Boles
(74) *Attorney, Agent, or Firm*—Gerald E. Hespos; Anthony J. Casella

(57) ABSTRACT

The vehicle heating appliance comprises a fuel supply (12) for supplying a liquid fuel to a combustion device (24) and a remotely controllable valve (46) disposed in the fuel supply (12). In order to provide a vehicle with a heating appliance, with which safety-critical situations are substantially avoided, an overpressure safety device (50) is provided in the fuel supply (12).

11 Claims, 3 Drawing Sheets

VEHICLE HEATING APPLIANCE WITH A VALVE IN THE FUEL SUPPLY

BACKGROUND OF THE INVENTION

1. Field of the Invention

The invention relates to a vehicle heating appliance, in particular an auxiliary or additional heating appliance, having a fuel supply for supplying a liquid fuel to a combustion device, in particular to a fuel nozzle, and having a remotely controllable valve disposed in the fuel supply. The invention further relates to a vehicle having such a heating appliance.

2. Description of the Related Art

From DE 195 45 677 A1 a fuel-operated vehicle heating appliance with atmospheric vaporizing burner is known, in which there is disposed in a fuel line a check valve, which is open during operation of the heating appliance. The check valve is a remotely controllable on-off shutoff valve. Alternatively, as a check valve, a spring-loaded pressure valve may be used, which is biased counter to the feed direction of the fuel but is not remotely controllable. The check valve is intended to prevent bubble formation and empty vaporization of the fuel line. The use of a remotely controllable on-off shutoff valve may lead to a safety-critical overpressure in the fuel line. The use of a spring-loaded pressure valve always entails a specific minimum pressure upstream of the valve if fuel is to be pumped through the latter.

From DE 195 26 003 A1 a heating appliance is known, in which fuel is pumped by a pressure-controlled fuel pump through a fuel line to a burner. Disposed in the fuel line is a solenoid valve, which forms a throttling point and offers the flowing fuel a resistance, which rises superproportionally as the flow volume increases. Here too, in the closed state of the solenoid valve an overpressure situation may arise in the fuel line.

From DE 44 15 513 A1 and DE 197 24 502 C1 heating appliances are known, in which electrically controllable valves are provided in combination with an accumulator so that, independently of the pressure supplied by a pump, a reliable delivery of fuel to the burner is guaranteed.

The underlying object of the invention is to provide a vehicle with a heating appliance, with which safety-critical situations are substantially avoided and, in particular, evaporative emission of fuel from an open fuel line is reduced.

SUMMARY OF THE INVENTION

According to the invention said object is achieved by an initially described heating appliance, in which an overpressure safety device is provided in the fuel supply, and by a vehicle, in which such a heating appliance according to the invention is installed.

The invention is based on the discovery that, whilst the arrangement, described in DE 195 45 677 A1, of an on-off check valve in a fuel line does in principle involve a safety risk, said risk may be circumvented through a clever improvement of the arrangement. To said end the invention, in addition to a remotely controllable check valve disposed in the fuel line, provides an overpressure safety device.

The overpressure safety device may be disposed at the fuel line at the discharge end of a fuel pump and ensures that, even in the event of malfunction of the fuel pump, no safety-critical situation may arise. At the same time, the likewise provided remotely controllable check valve prevents an evaporation of fuel at the fuel line. The check valve may be purposefully opened so that it then offers only a slight flow resistance. In contrast to a spring-loaded pressure valve known from DE 195 45 677 A1, the arrangement according to the invention of a remotely controllable check valve in combination with an overpressure safety device does not lead to an undesirably high back pressure in the fuel line.

In an advantageous development of the invention the overpressure safety device provided according to the invention is connected in parallel to the remotely controllable valve. With such an arrangement of check valve and overpressure safety device it is possible, in the event of the discharging of fuel at high pressure through the overpressure safety device, for said fuel to be carried away into the combustion chamber of the heating appliance. The combustion chamber may subsequently be ventilated so that the fuel volatizes. Alternatively, the fuel at the discharge end of the fuel pump may be carried away elsewhere. It is particularly advantageous when the fuel is carried back into a fuel tank, from which it was previously fetched by the fuel pump.

The overpressure safety device provided according to the invention is advantageously designed as a valve, the valve body of which is spring-biased counter to the direction of flow of the fuel in the fuel supply. By the term "valve body" in the present context are meant all flow bodies, which offer resistance to the flowing fuel and may simultaneously be deflected and/or displaced by the latter. Fuel may be discharged at times by means of the valve, wherein the valve body is afterwards moved back into its initial position in order to close the fuel line again. At the valve body a signalling device may be disposed, with the aid of which an opening of the valve and hence the occurrence of a safety-relevant state may be identified.

The overpressure safety device may be designed as a check valve, in particular as a ball valve, which changes abruptly from a closed state to an open state. The overpressure safety device may further be designed as a throttle valve, with which after opening a variable or a constant throttling effect arises. With said different types of valve variant the safety function of the overpressure safety device may be purposefully adjusted to a total or damped discharge of fuel in the event of a risk of overpressure.

In a particularly economical variant of the overpressure safety device provided according to the invention, said device is designed as a bursting disk.

In order to discharge fuel into the combustion chamber, the overpressure safety device is advantageously disposed in the vicinity of the combustion device, thereby dispensing with additional lines for carrying the fuel away.

The overpressure safety device may be of a particularly compact design and economical to manufacture when the overpressure safety device is constructed with the remotely controllable valve in the form of a unit.

In said case, a particularly compact unit may be created when the overpressure safety device is disposed in the remotely controllable valve, in particular in a piston of said valve.

Alternatively, the overpressure safety device may be constructed in a unit with a fuel pump, wherein the fuel may advantageously be fed back into the suction line of the fuel pump.

To enable purposeful adjustment of a desired overpressure threshold in a heating appliance already assembled or fitted into a vehicle, the overpressure safety device is advantageously provided with a means of adjusting a protected overpressure.

BRIEF DESCRIPTION OF THE DRAWINGS

There now follows a detailed description of embodiments of a vehicle heating appliance according to the invention with reference to the accompanying diagrammatic drawings. Said drawings show in.

DETAILED DESCRIPTION OF THE EMBODIMENTS

Figure 1:
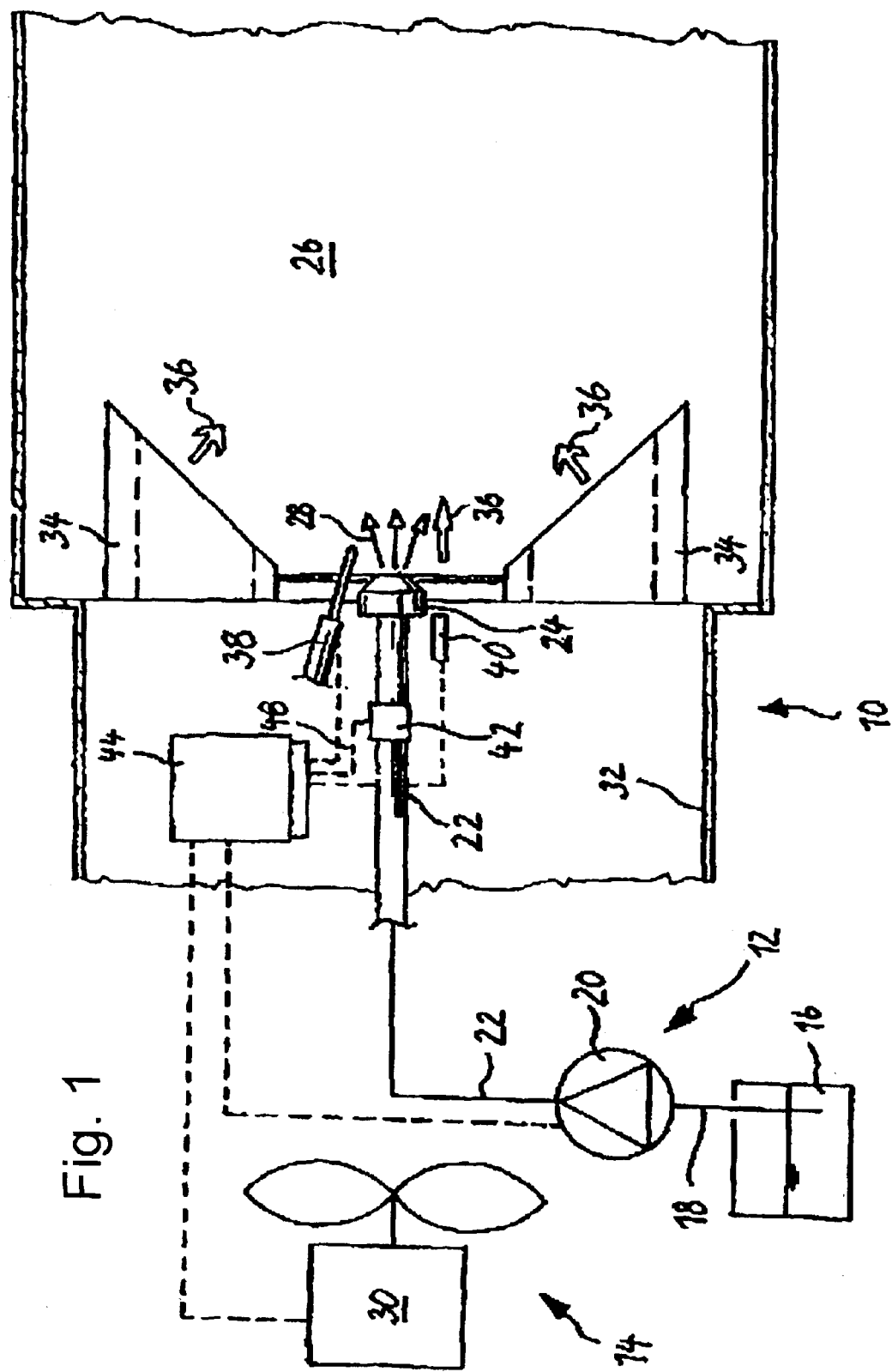
FIG. 1 is a partial longitudinal section of a heating appliance with a unit according to the invention comprising a remotely controllable valve and an overpressure safety device at the fuel supply.

The heating appliance partially illustrated in FIG. 1 is an engine-independent air heating appliance having a burner 10, to which liquid fuel is fed by a fuel supply 12 and combustion air is fed by a combustion air supply 14.

The fuel supply 12 comprises a fuel tank 16, from which the fuel is fetched through a suction light 18 by a fuel pump 20 and is then pressed into a pressure line 22. The fuel exits at a fuel nozzle 24 in a combustion chamber 26 of the burner 10 substantially in the direction of arrows 28.

As combustion air supply 14 a combustion air fan 30 is provided, which delivers combustion air through a combustion air channel 32 to the combustion chamber 26, where it enters as primary air and secondary air i.a. through a swirl device 34 in the direction of the arrows 36.

Disposed next to the fuel nozzle 24 is an ignition device 38, by means of which the mixture of fuel and combustion air formed in the combustion chamber may be ignited. Further provided next to the fuel nozzle 24 is a flame detector 40, by means of which the temperature of the ignited flame may be determined.

Figure 2:
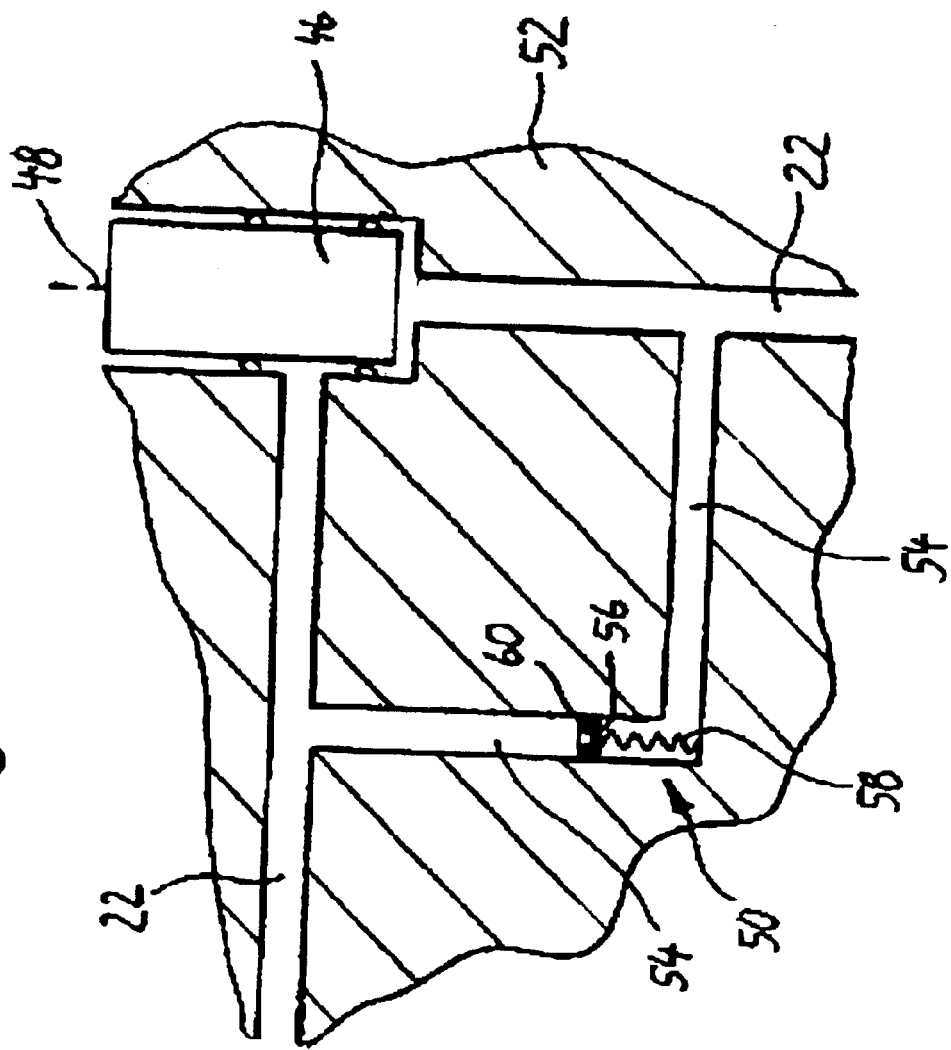
FIG. 2 is an enlarged longitudinal section of the unit according to the invention comprising a remotely controllable valve and an overpressure safety device according to FIG. 1 in a first embodiment.

Disposed in the pressure line 22 immediately upstream of the fuel nozzle 24 is a unit 42, which is illustrated in detail in FIG. 2.

The flame detector 40, the ignition device 38, the combustion air fan 30 and the fuel pump 20 are connected by electric lines each illustrated by dashes to a control device 44, which may process signals of the flame detector 40 and control the other described devices 20, 30 and 38 in dependence upon said signals.

During operation of the heating appliance the intention is that fuel may be made available at the combustion device 24 in as short a term as possible but, at the same time, during stoppage of the heating appliance there is no undesired exit of fuel. It moreover has to be ensured that, even in the event of a fault in a component of the heating appliance, no safety-critical state may arise.

In FIG. 2 the unit 42 is illustrated in detail. It comprises a remotely controllable valve 46 in the form of a solenoid valve, which via a line 48 also illustrated by dashes in FIG. 1 may be moved with the aid of the control device 44 into an open and a closed state. In its neutral position the valve 46 is closed.

Further provided in the unit 42 is an overpressure safety device 50 in the form of a spring-loaded pressure relief valve. The overpressure safety device 50 is disposed in a housing 52, in which the valve 46 is also mounted. Extending through the housing 52 is the pressure line 22, wherein branching off from the latter is a bypass line 54, which bypasses the valve 46 and runs back into the pressure line 22 downstream of the valve 46. In said bypass line 54 the overpressure safety device 50 is fashioned with a disk-shaped valve body 56, which is pressed by a spring 58 against an annular valve seat 60.

By means of the valve 46 the pressure line 22 may be purposefully opened when fuel is to exit at the combustion device 24. The pressure line 22 may moreover be closed in order to prevent an evaporation of fuel into the combustion device 24.

While the valve 46 is closed, a malfunction of the fuel pump 20 may lead to an undesirably high and possibly also safety-relevant pressure rise in the pressure line 22. To prevent the pressure in the pressure line 22 from rising above an inadmissible value and threatening to burst the pressure line 22, the overpressure safety device 50 is provided, by means of which fuel at high pressure may be directed through the bypass line 54 past the closed valve 46.

Figure 3:
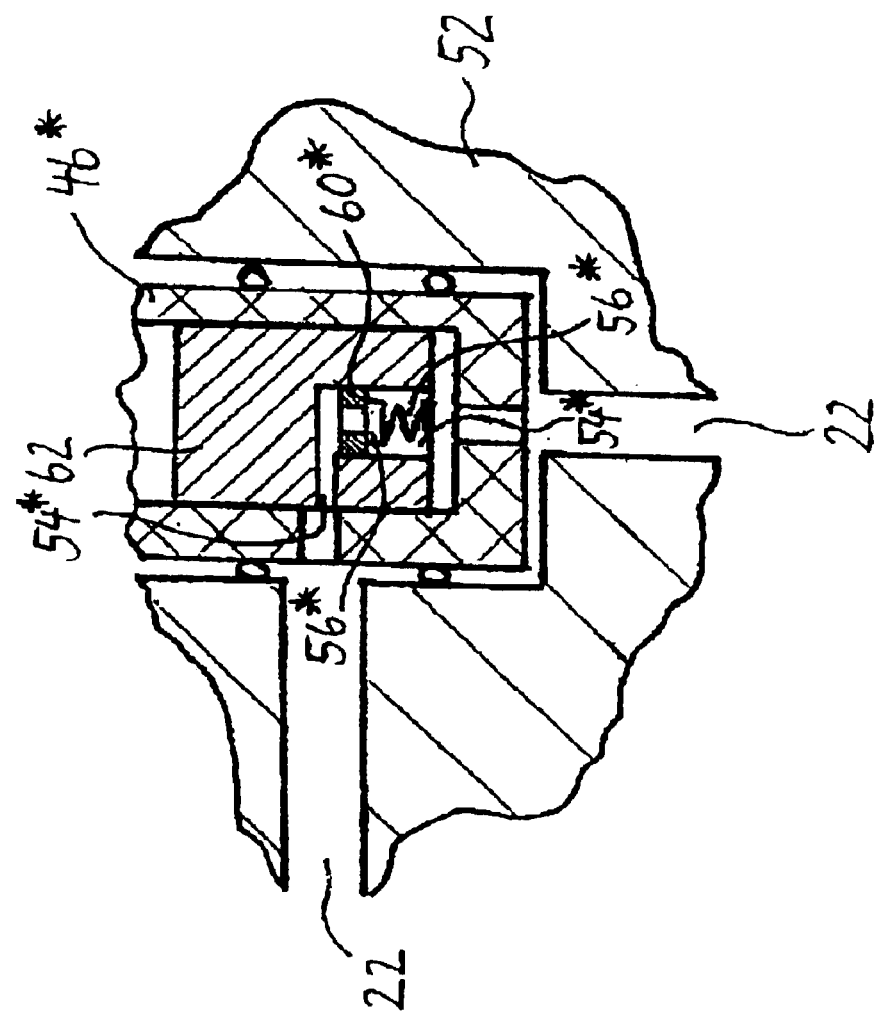
FIG. 3 is an enlarged longitudinal section of the unit according to the invention comprising a remotely controllable valve and an overpressure safety device according to FIG. 1 in a second embodiment.

FIG. 3 shows a second embodiment of a unit according to the invention comprising a valve 46* and an overpressure safety device 50*. The valve 46* of the second embodiment is provided with a piston 62, which for closing the pressure line 22 is mounted displaceably in the valve 46*. The overpressure safety device 50* in the second embodiment is disposed in the piston 62 of the valve 46* and, when the piston 62 moves, is displaced together with the latter.

Like the overpressure safety valve 50, the overpressure safety device 50* is designed with a valve body 56*, which is biased by a spring 58* towards a valve seat 60*. The valve body 56* closes a bypass line 54*, which penetrates the piston 62.

When the valve 46* is closed, in the event of a safety-critical pressure rise then, in the manner described above, the pressure line 22 is opened for a short time with the aid of the overpressure safety device 50* disposed in the piston 62 and pressure is discharged through the bypass line 54*.

The overpressure safety device 50 and/or 50* may be provided at the valve body 56 and/or 56* with a non-illustrated position pickup, by means of which the control device 44 may be informed when the overpressure safety device 50 and/or 50* comes into operation. Alternatively, a non-illustrated pressure sensor may be provided at the pressure line 22 for identifying a safety-relevant pressure rise in the pressure line 22 and signalling said pressure rise optionally to a fault memory or a fault indicating display within the range of vision of a driver of the associated vehicle.

What is claimed is:

1. A vehicle heating appliance, having a fuel supply for supplying a liquid fuel to a burner, having a remotely controllable valve disposed in the fuel supply, to purposefully open the fuel supply when liquid fuel is to exit at the burner and having an overpressure safety device provided in the fuel supply to prevent pressure in the fuel supply from rising above an inadmissible value and threatening to burst the fuel supply.

2. The heating appliance of claim 1, characterized in that the overpressure safety device is connected in parallel to the remotely controllable valve.

3. The heating appliance of claim 2, characterized in that the overpressure safety device is a pressure relief valve having a valve body which is spring-biased counter to a direction of flow of fuel in the fuel supply.

4. The heating appliance of claim 3, characterized in that the overpressure safety device is a throttle valve.

5. The heating appliance of claim 2, characterized in that the overpressure safety device is a bursting disk.

6. The heating appliance of claim 1, characterized in that the overpressure safety device is disposed in proximity to the burner.

7. The heating appliance of claim 1, characterized in that the overpressure safety device is combined with the remotely controllable valve in a unit.

8. The heating appliance of claim 7, characterized in that the overpressure safety device is disposed in a piston of said remotely controllable valve.

9. The heating appliance of claim 1, characterized in that the overpressure safety device is constructed in a unit with a fuel pump.

10. The heating appliance of claim 1, characterized in that the overpressure safety device is provided with a means for adjusting a protected overpressure.

11. A vehicle having a heating appliance according to claim 1.

* * * * *